United States Patent [19]

Perry et al.

[11] Patent Number: 5,225,287

[45] Date of Patent: Jul. 6, 1993

[54] NICKEL, CHROMIUM, IRON ALLOY TYPE SUSCEPTOR STRUCTURE

[75] Inventors: Michael R. Perry, Plymouth; Andrew H. Johnson, Maple Grove; Ronald R. Lentz, Wayzata, all of Minn.; Craig M. Shevlin, Santa Rosa, Calif.

[73] Assignee: The Pillsbury Company, Minneapolis, Minn.

[21] Appl. No.: 695,563

[22] Filed: May 3, 1991

[51] Int. Cl.$^5$ ...................... B32B 15/08; B32B 15/04; B32B 15/10; B32B 27/06

[52] U.S. Cl. .................. 428/458; 428/34.2; 428/35.8; 428/242; 428/283; 428/328; 428/457; 428/464; 428/480

[58] Field of Search ............ 428/458, 457, 480, 464, 428/35.8, 242, 283, 328, 34.2

[56] References Cited

U.S. PATENT DOCUMENTS

| | | | |
|---|---|---|---|
| 4,197,337 | 4/1980 | Di Biasi | 428/461 |
| 4,322,276 | 3/1982 | Meckel et al. | 204/192 P |
| 4,426,275 | 1/1984 | Meckel et al. | 204/298 |
| 4,641,005 | 2/1987 | Seiferth | 219/10.55 |
| 4,666,263 | 5/1987 | Petcavich | 350/640 |
| 4,713,510 | 12/1987 | Quick et al. | 219/10.55 |
| 4,735,513 | 4/1988 | Watkins et al. | 383/116 |
| 4,833,007 | 5/1989 | Huang | 428/242 |
| 4,911,938 | 3/1990 | Fisher et al. | 426/107 |
| 4,916,279 | 4/1990 | Brown et al. | 219/10.55 |
| 4,933,526 | 6/1990 | Fisher et al. | 219/10.55 |
| 4,940,867 | 7/1990 | Peleg | 219/10.55 |

FOREIGN PATENT DOCUMENTS

| | | |
|---|---|---|
| 0312333 | 10/1988 | European Pat. Off. |
| 0320293 | 12/1988 | European Pat. Off. |
| 0320294 | 12/1988 | European Pat. Off. |
| 0335478 | 1/1989 | European Pat. Off. |
| 0343006 | 5/1989 | European Pat. Off. |

OTHER PUBLICATIONS

*Microwave Packaging Symposium*, Sponsored by Rutgers University Center for Packaging Science & Engineering and American Management Association Took place on Apr. 23rd and 24th, 1990.

*Plastics which extend the Performance of Microwave Packaging*, by F. E. McFarlane and C. M. Stipe, Eastman Chemical Company, Kingsport, Tenn.

A new product announcement distributed by Deposition Technologies, Inc. 4540 View Ridge Avenue, San Diego, Calif., 92123.

A brochure put out by Deposition Technologies, Inc.

*The Little Waves That Could*, Discover, Nov. 1989, by Mark Roman, pp. 54–60.

A group of overheads from a program by Timothy H. Begley and Henry C. Hollifield entitled Application of a Teflon Single-Sided Migration Cell for Measuring Migration through Microwave Susceptor Films.

*Primary Examiner*—Paul J. Thibodeau
*Assistant Examiner*—Leszek Kiliman
*Attorney, Agent, or Firm*—Kinney & Lange

[57] ABSTRACT

A susceptor includes a substrate and a metal layer coupled to the substrate. An adhesive layer is coupled to the metal layer and a support layer is coupled to the adhesive layer for supporting the susceptor structure. The metal layer includes nickel, chromium and iron each comprising a percentage of the metal layer approximately within the following ranges: nickel is 60% to 68%; chromium is 5% to 37%; and iron is 3% to 38%.

9 Claims, 5 Drawing Sheets

NICKEL, CHROMIUM, IRON ALLOY TYPE SUSCEPTOR STRUCTURE

BACKGROUND OF THE INVENTION

The present invention involves microwave cooking. More particularly, the present invention is a susceptor structure for use in a microwave oven.

Heating of foods in a microwave oven differs significantly from heating of foods in a conventional oven. In a conventional oven, heat energy is applied to the exterior surface of the food and moves inward until the food is cooked. Thus, food cooked conventionally is typically hot on the outer surfaces and warm in the center.

Microwave cooking, on the other hand, involves absorption of microwaves which characteristically penetrate far deeper into the food than does infrared radiation (heat). Also, in microwave cooking, the air temperature in a microwave oven may be relatively low. Therefore, it is not uncommon for food cooked in a microwave oven to be cooler on the surface and much hotter in the center.

However, in order to make the exterior surfaces of food brown and crisp, the exterior surfaces of the food must be heated to a sufficient degree such that moisture on the exterior surfaces of the food is driven away. Since the exterior surfaces of food cooked in a microwave oven are typically cooler than the interior of the food, it is difficult to brown food and make it crisp in a microwave oven.

In order to facilitate browning and crisping of food in a microwave oven, devices known as susceptors have been developed. Susceptors are devices which, when exposed to microwave energy, become very hot. By placing a susceptor next to a food product in a microwave oven, the surface of the food product exposed to the susceptor is surface-heated by the susceptor. Thus, moisture on the surface of the food is driven away from the surface of the food and the food becomes crisp and brown.

Many conventional susceptor structures have included a thin metal film, typically aluminum, deposited on a substrate such as polyester. The metalized layer of polyester is typically bonded, for support, to a support member such as a sheet of paperboard or corrugated paper.

Conventional susceptors, however, have certain drawbacks. They undergo a process, referred to herein as "breakup," in which the electrical continuity of the thin metal film is lost during cooking. The result of the loss of electrical continuity is an irreversible loss in the susceptor's microwave responsiveness and a lower level of percent power absorption by the susceptor during cooking. Lower power absorption leads to lower susceptor cooking temperatures and a corresponding decrease in the susceptor's ability to crisp food.

As an example of conventional susceptor operation, a frozen food product is placed on a susceptor. The susceptor and the food product are then subjected to microwave energy in a microwave oven. Since the imaginary part of the complex relative dielectric constant of ice is very low, the frozen food product is initially a poor absorber of microwave energy. Therefore, the susceptor is exposed to nearly the full amount of the microwave energy delivered in the microwave oven, heats rapidly and begins to undergo breakup. Meanwhile, the frozen food product absorbs very little energy.

As the frozen food product thaws and starts absorbing microwave energy, the ability of the susceptor to continue to absorb energy, and thereby continue to surface heat the food product, has already been significantly and irreversibly deteriorated by breakup. Since this deterioration (i.e., the change in the electrical continuity of the susceptor) is irreversible, the susceptor is incapable of absorbing enough of the microwave energy attenuated by the thawed food product to properly brown and crisp the food product. Therefore, although breakup prevents the susceptor from heating to a point where it would scorch paper (i.e., breakup prevents runaway heating) it also prevents the susceptor from achieving sustained heating.

Inconel has been used in susceptors in the past. However, these susceptors have been complex structures having multiple layers of Inconel on a plurality of sides of a substrate, where the susceptor did not achieve desired cooking performance.

Thus, there is a continuing need for the development of susceptor structures which are capable of continued heating and crisping of food products during microwave cooking.

SUMMARY OF THE INVENTION

A susceptor includes a substrate and a metal layer coupled to the substrate. An adhesive layer is coupled to the metal layer and a support layer is coupled to the adhesive layer for supporting the susceptor structure. The metal layer includes nickel, chromium and iron each in approximately the following range: nickel in a range of 60% to 68%; chromium in a range of 5% to 37%; and iron in a range of 3% to 38%.

DETAILED DESCRIPTION OF THE PREFERRED EMBODIMENTS

Figure 1A:
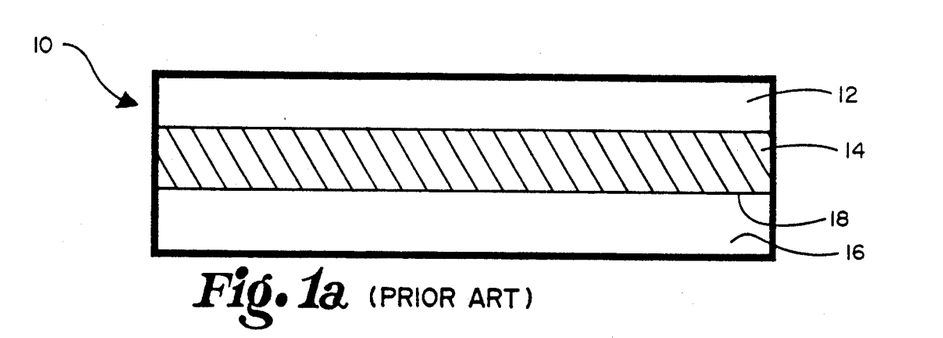
FIG. 1A is a side view of a conventional susceptor structure of the prior art.

FIG. 1A shows the relative position of components of a susceptor structure 10 (susceptor 10) of the prior art. It should be noted that susceptor 10 is not drawn to scale in FIG. 1A. For clarity's sake, the thicknesses of layers shown in FIG. 1A are greatly exaggerated.

Susceptor 10 includes substrate 12 upon which metalized layer 14 is deposited. Susceptor 10 also includes a support layer 16. Substrate 12 is typically a thin layer of oriented and heatset polyethylene terephthalate (PET). Metalized film 14 is an aluminum layer deposited on substrate 12 through vacuum evaporation, sputtering, or another suitable method. Support layer 16, typically paper paperboard or corrugated paper, is coupled to metalized layer 14 at interface 18 through the use of an adhesive.

Figure 1B:
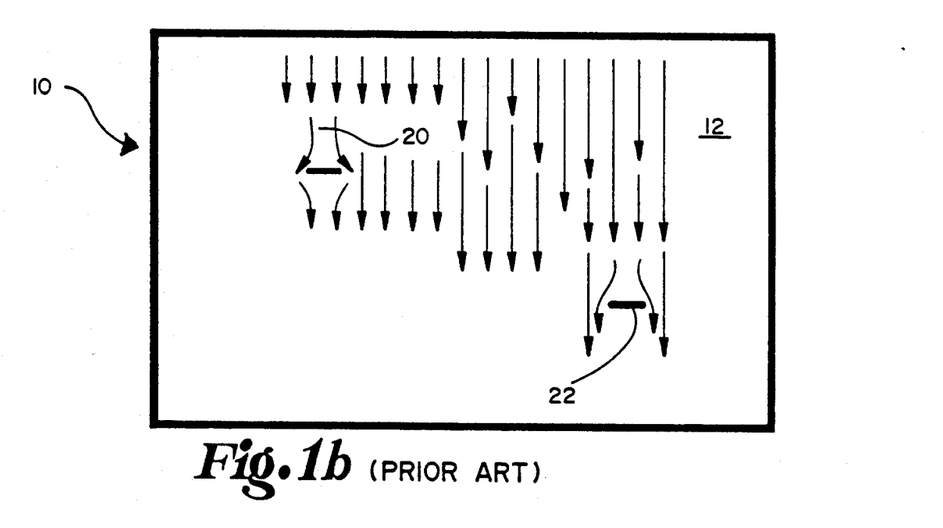
FIG. 1B is a top view of the susceptor structure shown in FIG. 1A showing the development of hot spots.

When susceptor 10 is placed in a microwave oven and exposed to microwave energy, current begins to flow in metalized layer 14 of susceptor 10 due to an electric field generated by the microwave oven. A portion of the current flowing in metalized layer 14 is indicated by the vertical arrows shown in FIG. 1B. As the current flows, metalized layer 14 begins to heat as a function of the current generated and the surface resistance (Rs) of layer 14. However, it has been observed that metalized layer 14 does not heat uniformly. Rather, hot spots such as hot spots 20 and 22 develop as illustrated in FIG. 1B.

As the metalized layer 14 continues to heat, and as hot spots 20 and 22 grow hotter, heat transfers throughout the susceptor 10, and the temperature of substrate 12 also increases. Discontinuities such as thinned areas, holes or cracks are formed in metalized layer 14 at the hot spots 20 and 22. It should be noted that, although the temperature of PET substrate 12 is 220°-260° C. at hot spots 20 and 22 when the discontinuities begin to form in substrate 12 the remainder of substrate 12 is typically much cooler (e.g. 200° C.-220° C. or even lower).

Figure 1C:
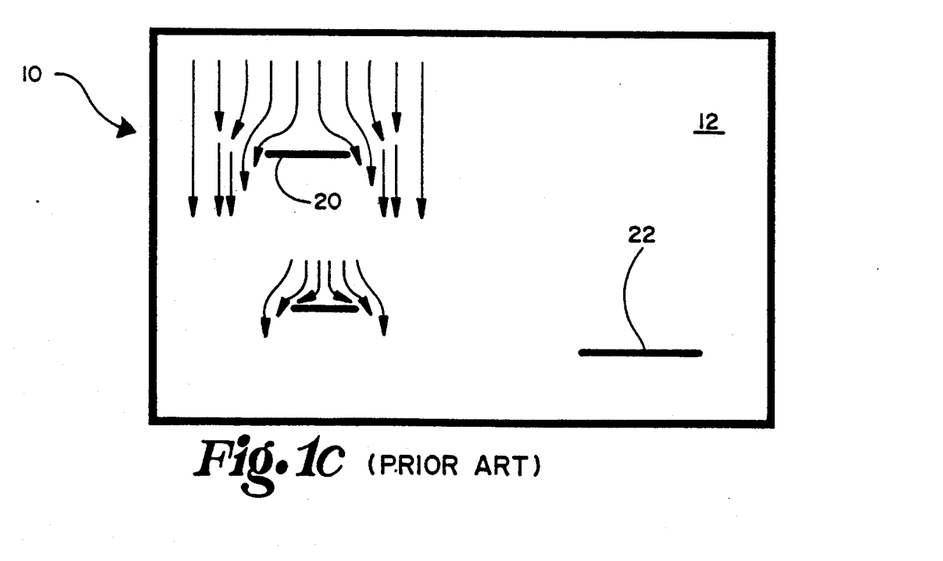
FIG. 1C is a top view of the susceptor structure shown in FIGS. 1A and 1B after discontinuities at the hot spots have expanded laterally.

FIG. 1C shows a top view of susceptor 10 after the discontinuities at hot spots 20 and 22 have expanded laterally. As the temperature of susceptor 10 continues to rise, additional lateral cracks form in substrate 12, thereby driving formation of more discontinuities in mtetalized layer 14. The lateral cracks and discontinuities which form in substrate 12 and metalized layer 14 substantially destroy the electrical continuity in metalized layer 14. This decreases the responsiveness of susceptor 10 to microwave energy, and susceptor 10 begins to cool despite continued exposure to microwave energy. Thus, the ability of susceptor 10 to provide sustained heating is essentially destroyed.

Figure 1D:
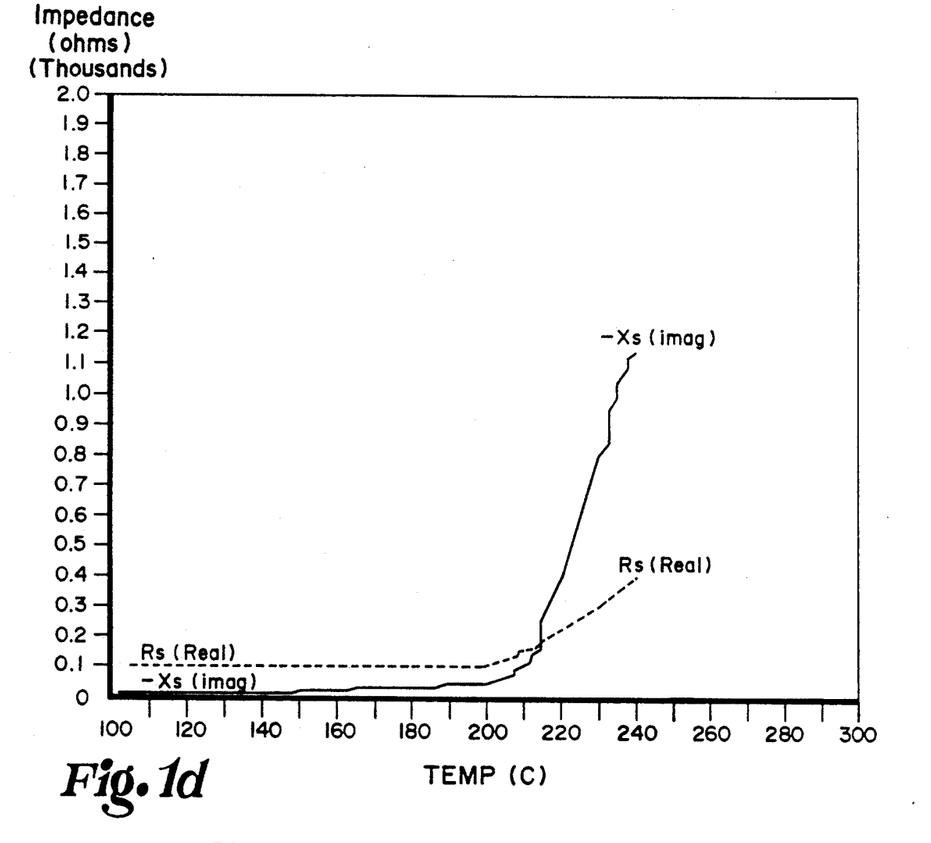
FIG. 1D is a graph showing surface impedance of a susceptor plotted against temperature in degrees C.

FIG. 1D shows a graph of the surface impedance (real, $R_s$, and imaginary, $X_s$) of the susceptor 10 plotted against temperature in degrees C. The discontinuities begin to form at approximately 200° C. and continue to form until susceptor 10 essentially stops heating or until heating is reduced.

It should be noted that the electrical field in a typical microwave oven has random direction. Thus, discontinuities generally come in many directions in metalized layer 14 and follow hot spot locations.

Figure 2:
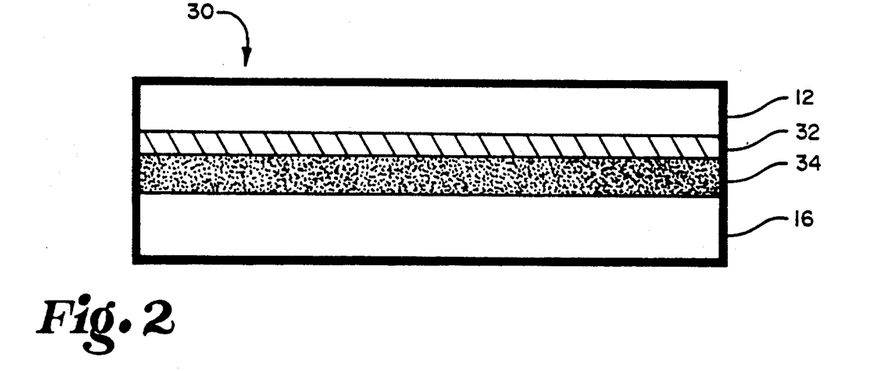
FIG. 2 is one embodiment of a susceptor structure of the present invention.

FIG. 2 shows a side view of a susceptor structure (susceptor 30) of the present invention. Substrate 12 and support layer 16 are similar to those used in the prior art susceptor shown in FIG. 1A. However susceptor 30 includes metalized layer 32. Metalized layer 32 includes a certain percentage of iron, chromium and nickel deposited on substrate 12 through vacuum evaporation. Metalized layer 32 is bonded to support layer 16 through the use of adhesive layer 34 which is typically an aqueous laminating adhesive. It has been observed that when the nickel, chromium and iron are combined in percentages where nickel is 60% to 68% of layer 14; chromium is 5% to 37% of layer 14; and iron is 3% to 38% of layer 14, the susceptor 30 achieves sustained.

EXAMPLE 1

As one example of susceptor 30 of the present invention, substrate 12 was a layer of Dupont's 92 gauge D mylar which is an oriented and heatset PET. Metalized layer 32 contains approximately a 200 Å layer of 61% by weight nickel, 32% by weight chromium and 6% by weight iron deposited on substrate 12 through vacuum evaporation. The composition of metalized layer 32 is determined using a Tracor Northern Series II energy dispersive x-ray analyzer. The x-ray analyzer is operated using an SQ (standardless quantitative analysis) program scanning electron at 15 keV with an acquisition time of 300-600 seconds. Layer 34 is a susceptor adhesive commercially available under the designation WC3458Y-EN from H. B. Fuller Co. of Vadnais Heights, Minn. Support layer 16 is a 17½ point uncoated susceptor board also commercially available from the Waldorf Corporation as 306-42A. The starting metal used in the vacuum evaporation step was Inconel.

Figure 3:
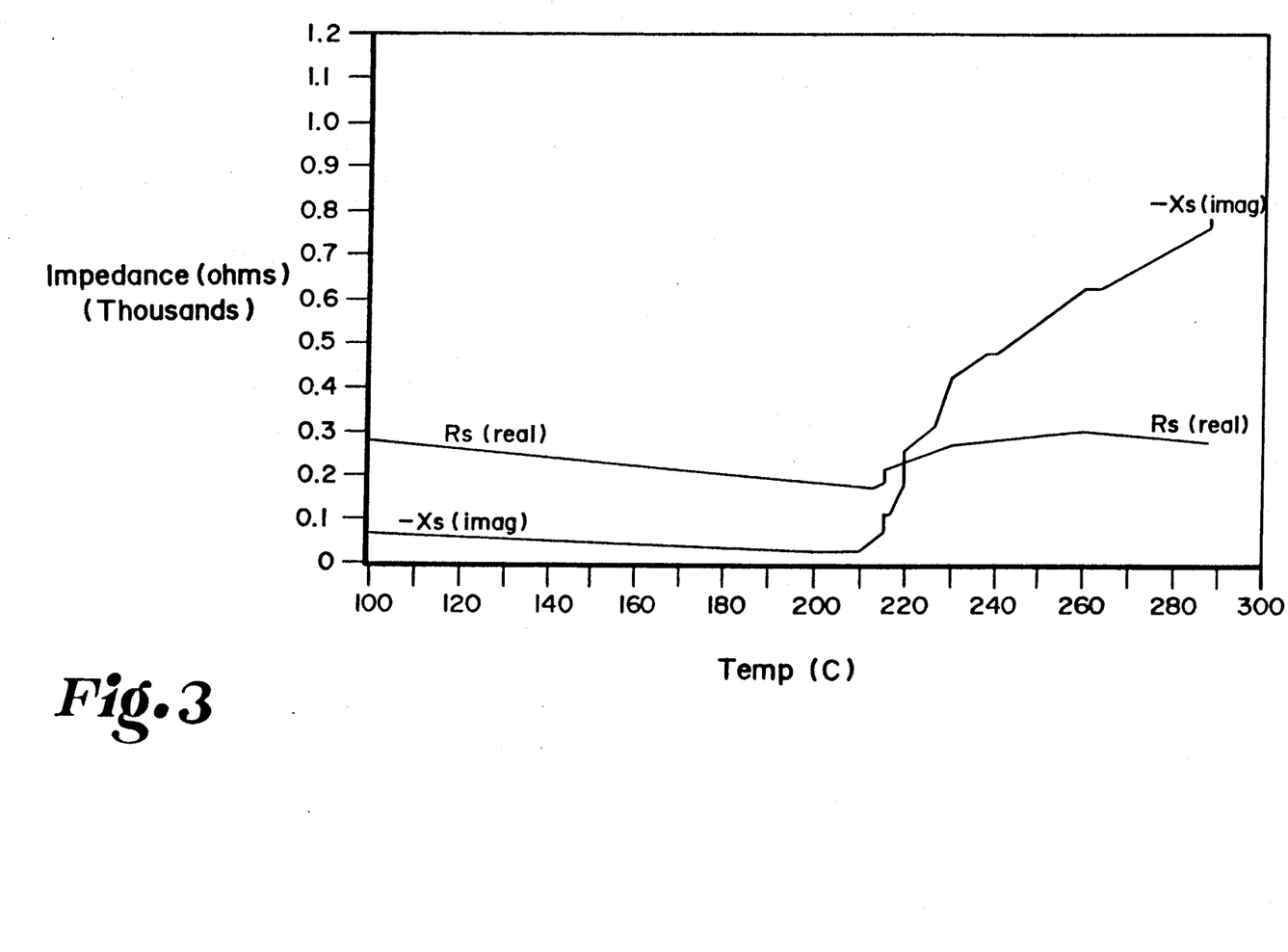
FIG. 3 is a graph showing surface impedance of a susceptor of the present invention plotted against temperature in degrees C.

FIG. 3 shows a graph of the surface impedance (real $R_s$, and imaginary, $X_s$) of susceptor 30 plotted against temperature in degrees C. As shown, susceptor 30 continues heating beyond the susceptor of the prior art and yields exceptional cooking performance.

EXAMPLE 2

Another example of susceptor 30 of the present invention included the same substrate 12, adhesive layer 34, and support layer 16 as in example 1. Metalized layer 14 was 56% chromium, 44% nickel and 0% iron. This metalized layer 14 had an unacceptable heating performance since sustained heating was not achieved substantially the same as that shown in FIG. 3.

EXAMPLE 3

A third example of susceptor 30 of the present invention was the same as that in Example 2 except that metalized layer 14 was 30% chromium, 64% nickel and 6% iron. The heating performance of the susceptor 30 according to this example was similar to that shown in FIG. 3.

EXAMPLE 4

In a fourth example, susceptor 30 was the same as that in Example 1 except that metalized layer 14 was 24.5% chromium and 75.5% nickel. This metalized layer 14 had an unacceptable heating performance since sustained heating was not achieved substantially the same as that shown in FIG. 3.

EXAMPLE 5

Another example was the same as that in FIG. 1 except that metalized layer 14 was 29.9% chromium and 70.1% nickel. This metalized layer 14 had an unacceptable heating performance since sustained heating was not achieved substantially the same as that shown in FIG. 3.

EXAMPLE 6

In another example of susceptor 30, all layers were the same as that in Example 1 except that the metalized layer 14 was 26.4% chromium, 65% nickel and 8.6% iron. The heating performance was similar to that shown in FIG. 3.

EXAMPLE 7

In another example, all layers were the same as that in Example 1 except that the metalized layer 14 was 32.1% chromium, 58.3% nickel and 9.6% iron. This metalized layer 14 had an unacceptable heating performance since sustained heating was not achieved substantially the same as that shown in FIG. 3.

EXAMPLE 8

In another example of susceptor 30, all layers were the same as that shown in Example 1 except that the metalized layer 14 was 33.4% chromium, 57.1% nickel and 9.5% iron. This metalized layer 14 had an unacceptable heating performance since sustained heating was not achieved substantially the same as that shown in FIG. 3.

EXAMPLE 9

In another example of susceptor 30, all layers were the similar to that shown in Example 1 except that the metalized layer 14 was 32.8% chromium, 60.2% nickel and 7.1% iron. The heating performance was similar to that shown in FIG. 3.

EXAMPLE 10

In another example of susceptor 30, all of the layers were the same as those in Example 1 except that the metalized layer 14 was 68.2% chromium, 4.6% nickel and 27.1% iron. This metalized layer 14 had an unacceptable heating performance since sustained heating was not achieved substantially the same as that shown in FIG. 3.

EXAMPLE 11

In another example of susceptor 30, all of the layers were the same as those used in Example 1 except that the metalized layer 14 was 64.5% chromium, 10.8% nickel and 24.8% iron. This metalized layer 14 had an unacceptable heating performance since sustained heating was not achieved substantially the same as that shown in FIG. 3.

EXAMPLE 12

In another example of susceptor 30, all the layers were the same as those used in Example 1 except that the metalized layer 14 was 45% chromium, 7.5% nickel and 47.5% iron. This metalized layer 14 had an unacceptable heating performance since sustained heating was not achieved substantially the same as that shown in FIG. 3.

EXAMPLE 13

In another example of susceptor 30, all the layers were the same as those used in Example 1 except that the metalized layer 14 was 9% chromium, 1% nickel and 90% iron. The heating performance was unacceptable since sustained heating was not achieved in substantially the same manner as that shown in FIG. 3.

EXAMPLE 14

In another example of susceptor 30, all the layers were the same as those used in Example 1 except that the metalized layer 14 was 4% chromium, 96% nickel and 0% iron. The heating performance was unacceptable since sustained heating was not achieved in substantially the same manner as that shown in FIG. 3.

EXAMPLE 15

In another example of susceptor 30, all the layers were the same as those used in Example 1 except that the metalized layer 14 was 98% chromium, 1% nickel and 1% iron. The heating performance was unacceptable since sustained heating was not achieved in substantially the same manner as that shown in FIG. 3.

EXAMPLE 16

In another example of susceptor 30, all the layers were the same as those used in Example 1 except that the metalized layer 14 was approximately 34.1% chromium, 56.8% nickel and 9.1% iron with a trace of copper. The heating performance was unacceptable since sustained heating was not achieved in substantially the same manner as that shown in FIG. 3.

EXAMPLE 17

In another example of susceptor 30, all the layers were the same as those used in Example 1 except that the metalized layer 14 was approximately 32.2% chromium, 58.4% nickel and 9.4% iron with a trace of copper. The heating performance was unacceptable since sustained heating was not achieved in substantially the same manner as that shown in FIG. 3.

EXAMPLE 18

In another example of susceptor 30, all the layers were the same as those used in Example 1 except that the metalized layer 14 was approximately 0% chromium, 45% nickel and 55% iron. The heating performance was unacceptable since sustained heating was not achieved in substantially the same manner as that shown in FIG. 3.

Figure 4:
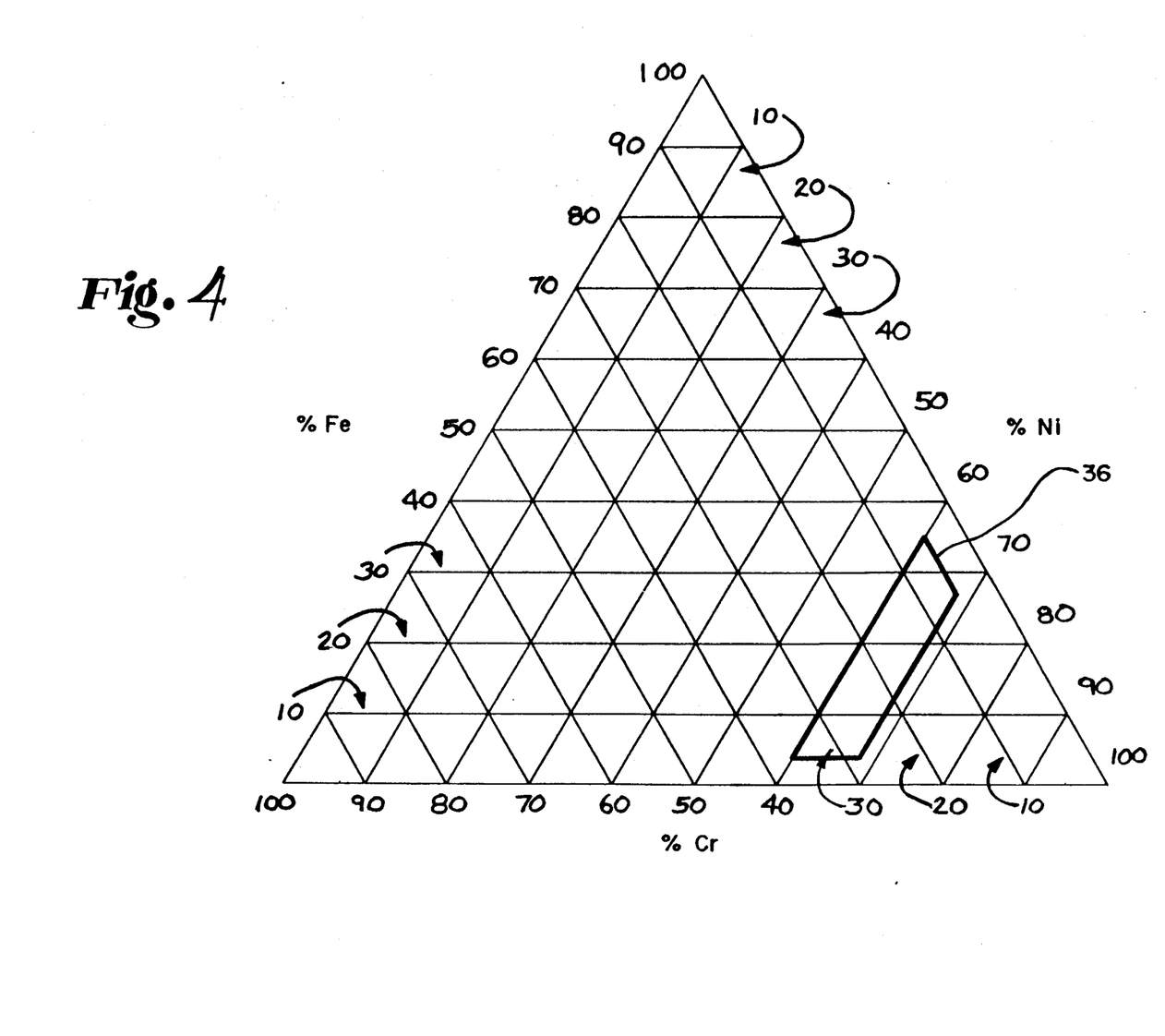
FIG. 4 is a tri-coordinate graph showing a range of metal components used to form a susceptor of the present invention.

FIG. 4 is a tri-coordinate graph showing a percent of iron plotted against a percent of nickel and a percent of chromium. It has been observed that desired performance (i.e., continued heating without runaway heating) in susceptor 30 occurs where metalized layer 32 is formed with a percentage of iron, chromium and nickel within the range defined by box 36 in FIG. 4. In other words, where metalized layer 32 is formed of nickel in a range of approximately 60% to 68%, chromium in a range of approximately 5% to 37%, and iron in a range of approximately 3% to 38% by weight of metalized layer 32, continued heating has been observed in susceptor 30.

Figure 5:
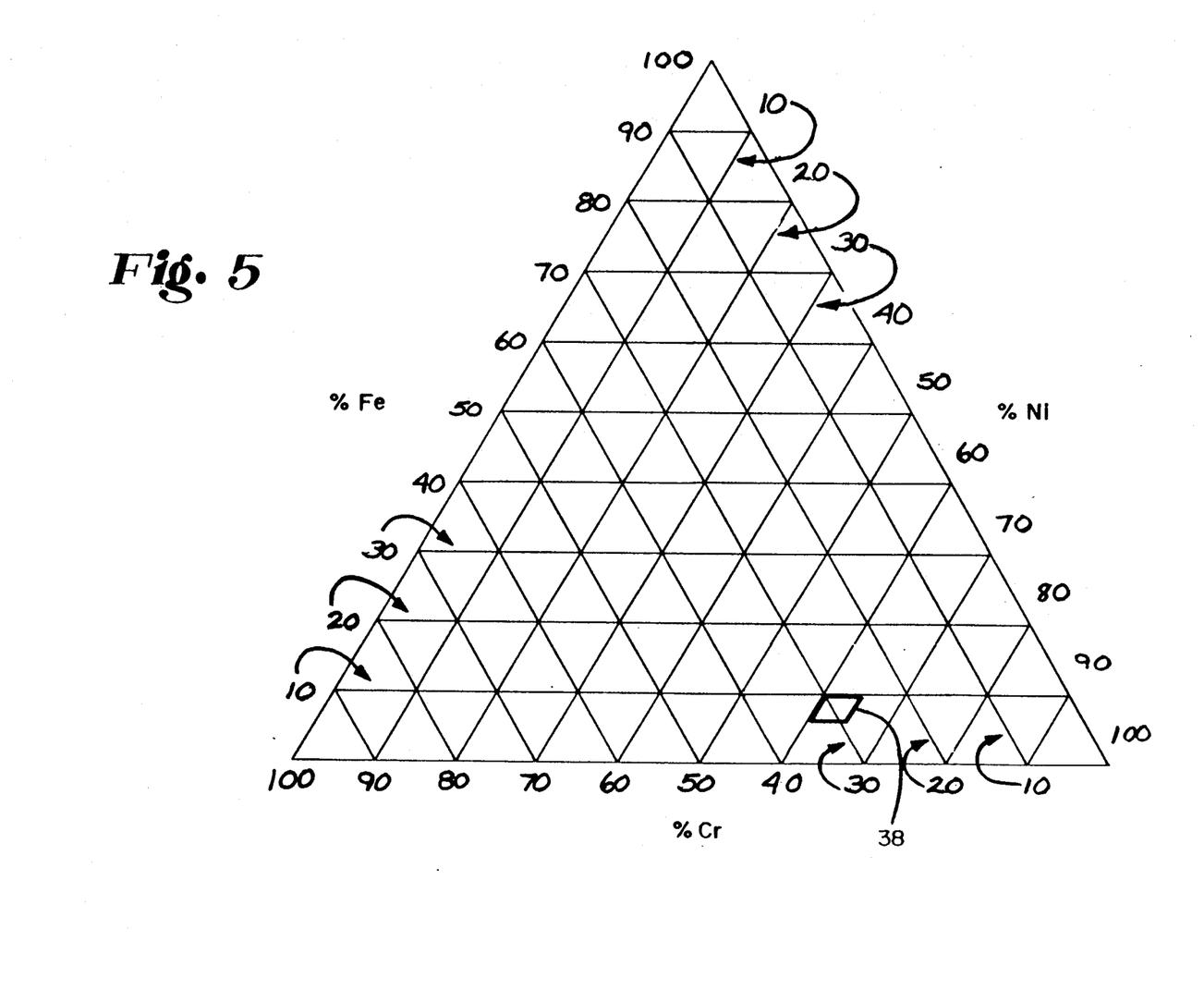
FIG. 5 is a tri-coordinate plot graph showing a second range of metal components used to form a susceptor of the present invention.

FIG. 5 is identical to the tri-coordinate plot of FIG. 4 except that a narrower range is shown. It has been observed that particularly desirable susceptor heating has been obtained when metalized layer 32 is formed of nickel, chromium and iron having percentages within the ranges defined by box 38 in FIG. 5. Box 38 defines a metalized layer 32 wherein the portion of nickel is in a range of approximately 60% to 65%, chromium is in a range of approximately 26% to 33% and iron is in a range of approximately 6% to 9%.

The susceptor structure of the present invention utilizes a metalized layer having nickel, chromium and iron approximately within the percentage ranges given above to improve the heating performance of conventional susceptors when exposed to microwave energy. The susceptor structure initially heats up very quickly due to high power absorption. Although metalized layer 32 undergoes some breakup during heating, it remains intact to provide enough electrical continuity such that sustained heating is obtained in the susceptor structure.

It should also be noted that the given compositions can be achieved using a number of starting materials. For example, although the starting material in the above examples was Inconel, it could also be stainless steel or another alloy suitable for providing the given target compositions. As an illustration of this, example #3 was vapor deposited using 316 stainless steel.

Although the present invention has been described with reference to preferred embodiments, workers skilled in the art will recognize that changes may be made in form and detail without departing from the spirit and scope of the invention.

What is claimed is:

1. A susceptor, comprising:
   a substrate;
   a metal layer, in contact with only one side of the substrate, consisting essentially of:
   nickel in a range of approximately 60% to 68% by weight;
   chromium in a range of approximately 5% to 37% by weight; and
   balance iron wherein iron comprises at least approximately 3% by weight of the metal layer;
   an adhesive layer adhered to the metal layer; and
   a support layer adhered to the adhesive layer.
2. The susceptor of claim 1 wherein the adhesive comprises:
   a layer of aqueous laminating adhesive.
3. The susceptor of claim 1 wherein the substrate comprises polyethylene terephthalate (PET).
4. The susceptor of claim 1 wherein the support layer comprises paperboard.
5. The susceptor of claim 1, the metal layer consisting essentially of:
   nickel in a range of approximately 60% to 65%;
   chromium in a range of approximately 26% to 33%; and
   iron in a range of approximately 6% to 9%.
6. A susceptor, comprising:
   a substrate;
   a metal layer, in contact with the substrate, consisting essentially of:
   nickel in a range of approximately 60% to 65% by weight;
   iron in a range of approximately 6% to 9% by weight; and
   balance chromium;
   an adhesive layer adhered to the metal layer; and
   a support layer adhered to the adhesive layer.
7. The susceptor of claim 6 wherein the adhesive comprises:
   a layer of aqueous laminating adhesive.
8. The susceptor of claim 6 wherein the substrate comprises polyethylene terephthalate (PET).
9. The susceptor of claim 6 wherein the support layer comprises paperboard.

* * * * *

UNITED STATES PATENT AND TRADEMARK OFFICE
CERTIFICATE OF CORRECTION

PATENT NO. : 5,225,287

DATED : July 6, 1993

INVENTOR(S) : MICHAEL R. PERRY, ANDREW H. JOHNSON
RONALD R. LENTZ, CRAIG M. SHEVLIN

It is certified that error appears in the above-identified patent and that said Letters Patent is hereby corrected as shown below:

Col. 8, line 8, after "65%", insert --by weight--

Col. 8, line 9, after "33%", insert --by weight--

Col. 8, line 11, after "9%", insert --by weight--

Signed and Sealed this

Twenty-fifth Day of January, 1994

*Attest:*

BRUCE LEHMAN

*Attesting Officer*     *Commissioner of Patents and Trademarks*